Patented June 28, 1932

1,864,546

UNITED STATES PATENT OFFICE

GEORGE W. MILES, OF BOSTON, MASSACHUSETTS, ASSIGNOR TO CELANESE CORPORATION OF AMERICA, A CORPORATION OF DELAWARE

PROCESS OF PREPARING CELLULOSE ETHERS

No Drawing. Application filed July 10, 1928. Serial No. 291,706.

This invention relates to the preparation of cellulose ethers such as ethyl cellulose, methyl cellulose or benzyl cellulose, etc. in a novel manner.

An object of my invention is to prepare cellulose ethers in a simple and expeditious manner, which cellulose ethers have desirable solubility characteristics. Other objects of my invention will appear from the following detailed description.

In accordance with my invention, I treat an alkali cellulose containing cellulose and a suitable amount of alkaline solution with the full amount of etherifying agent required, and then add alkali in concentrated form in increments while maintaining suitable temperatures for etherification.

The alkali cellulose to be employed in my process may be formed by impregnating a cellulosic material, such as cotton linters, cotton, wood pulp or reconstituted cellulose made from viscose, with an excess of alkaline solution corresponding to a 15 to 20% caustic soda solution and preferably an 18% caustic soda solution. The cellulosic material is allowed to contact with the excess of caustic soda solution for 1 to 3 days, and is then pressed down to 240 to 300 parts by weight for each 100 parts by weight of the cellulosic material employed. As another mode of preparing the alkali cellulose, 140 to 200 parts by weight of a 15 to 20% caustic soda solution may be added to 100 parts of cellulosic material and the same thoroughly mixed.

Any suitable etherifying agent may be used. This etherifying agent may be any suitable alkyl, aryl or aralkyl ester of an inorganic or organic acid. If ethyl cellulose is to be formed, I have found that diethyl sulfate, ethyl chloride, ethyl bromide or ethyl iodide may be employed. If methyl cellulose is to be formed, dimethyl sulfate or any of the methyl halides may be used. For preparing benzyl cellulose, a benzyl halide such as benzyl chloride may be employed in the etherifying process. As to the amount of etherifying agent to be employed, I find that from 4 to 9 molecular proportions of etherifying agent to each molecular proportion of cellulose, $(C_6H_{10}O_5)$, and preferably from 5 to 7 molecular proportions of etherifying agent, produces eminently satisfactory results.

The total amount of alkali added is preferably slightly in excess of that required completely to react with the etherifying agent; that is to say, slightly more than one molecular proportion of alkali to one molecular proportion of etherifying agent. This proportion holds true even with a substance like diethyl sulfate, since in the etherifying process, one molecule of sodium hydroxide combines with one molecule of diethyl sulfate to form sodium ethyl sulfate. While I prefer to add the alkali in finely divided solid form, at least part of the alkali may be added in the form of a concentrated solution such as a 50% caustic soda solution. The alkali used throughout this process may be any suitable alkali such as sodium hydroxide, potassium hydroxide or calcium hydroxide.

The temperature of the etherification may range from room temperature to 60° C. or more, but I have found that temperatures of 30° to 45° C. produces most satisfactory results. At room temperatures, the etherification reaction takes place very slowly and requires from 4 to 7 days for completion; at 40° C., the etherification requires about 15 hours while at 45° C., the etherification is substantially completed in 9 hours.

In order to further illustrate my invention, the following specific example is given.

*Example*

As a starting material, a soda cellulose formed by impregnating 100 parts of cellulose with a large excess of an 18% caustic soda solution for one day and then pressing to a weight of 240 parts, is used. 20 parts of this soda cellulose and containing one molecular proportion of cellulose $(C_6H_{10}O_5)$ is treated with 54 parts of diethyl sulfate (7 molecular proportions.) To this mixture solid caustic soda is added in increments during the etherification process, the total amount of caustic soda employed being 14 parts by weight which corresponds to 8 molecular proportions. The ethylation of the cellulose is permitted to proceed for a period of 9 hours while the temperature is maintained at 40° to 45° C. At the end of this period, the alkali content has dropped from 19.3% to 3.1% and no further decrease in the alkali content takes place on further heating at 50° C. The product thus formed is washed, and is found to be an ethyl cellulose containng no cold water soluble cellulose ethers, and which produces good flexible films from solutions of the same in solvents such as benzene.

It is to be understood that the foregoing detailed description is given merely by way of illustration and that many variations may be made therein without departing from the spirit of this invention.

Having described my invention, what I claim and desire to secure by Letters Patent is:

1. Method of preparing cellulose ethers comprising treating an alkali cellulose which contains 140 to 200 parts of an alkali solution corresponding to 15 to 20% solution of caustic soda and 100 parts of cellulose with an etherifying agent in amounts equal to 5 to 9 molecular proportions for each molecular proportion of cellulose present and causing etherification of the cellulose to proceed by adding alkali in solid form in increments in amounts sufficient to react with the etherifying agent present at temperatures ranging from room temperatures to 60° C.

2. Method of preparing ethyl cellulose comprising treating an alkali cellulose containing substantially 100 parts of cellulose and substantially 140 to 200 parts of a 15 to 20% caustic soda solution with diethyl sulfate in amounts equal to 5 to 9 molecular proportions for each molecular proportion of cellulose and then causing ethylation of the cellulose to proceed by adding an alkali in solid form in increments in amounts sufficient to react with the diethyl sulfate present at temperatures ranging from room temperate to 60° C.

3. Method of preparing ethyl cellulose comprising treating an alkali celllulose containing substantially 100 parts of cellulose and substantialy 140 to 200 parts of a 15 to 20% caustic soda soution with diethyl sulfate in amounts equal to 5 to 9 molecular proportions for each molecular proportion of cellulose and then causing ethylation of the cellulose to proceed by adding an alkali in solid form in increments in amounts sufficient to react with the diethyl sulfate present at temperatures ranging from room temperature to 60° C.

4. Method of preparing ethyl cellulose comprising treating an alkali cellulose containing substantially 100 parts of cellulose and substantially 140 to 200 parts of a 15 to 20% caustic soda soution with diethyl sulfate in amounts equal to 7 molecular proportions for each molecular proportion of cellulose and then causing ethylation of the cellulose to proceed by adding an alkali in solid form in increments in amounts sufficient to react with the diethyl sulfate present at temperatures ranging from room temperature to 60° C.

In testimony whereof, I have hereunto subscribed my name.

GEORGE W. MILES.